Patented Feb. 9, 1937

2,070,443

UNITED STATES PATENT OFFICE 2,070,443

METHOD FOR CURING POLY VINYL HALIDES

Randolph W. McGahey, Akron, Ohio, assignor to The B. F. Goodrich Company, New York, N. Y., a corporation of New York No Drawing. Application April 20, 1935, Serial No. 17,490

16 Claims. (Cl. 260—2)

This invention relates to compositions consisting essentially of polymerized vinyl halide with or without a plasticizer and has as its object to reduce the sensitiveness of such compositions to changes in temperature and particularly to temperatures considerably above room temperature.

Polymerized vinyl halides (particularly the chloride and bromide) can be plasticized by the addition of any one or several of a large number of plasticizers, which plasticizers are generally non-volatile aromatic liquids such as aromatic halogen derivatives, nitro compounds, amines, ethers, ketones, esters and the like. Rubber-like resilient gels are formed from the completely polymerized or gamma polymer of vinyl chloride, which is insoluble in ordinary solvents at room temperature, by dissolving it in approximately equal proportions of a plasticizer at an elevated temperature and then cooling to room temperature. Compositions resembling celluloid may be prepared from the incompletely polymerized or soluble modifications known as the alpha and beta polymers of vinyl chloride, as well as from the insoluble or gamma polymer, by adding small proportions of plasticizers. These compositions consisting essentially of polymerized vinyl chloride and a plasticizer suffer from the disadvantage that they are thermoplastic; that is, soften and become plastic or even fluid when heated. The same disadvantage is suffered to some extent even by the ploymerized vinyl chloride in the absence of plasticizers. Consequently it has not been possible heretofore to use such compositions for any purpose involving subjection to a temperature much over room temperature.

In the process of this invention the polymerized vinyl halide is preferably mixed with a plasticizer, and in addition, with a certain quantity of a water soluble sulfide and is heated. The resulting product, while still retaining its flexibility or resilience, is far less sensitive to changes in temperature than the previously known compositions, and may even be rendered non-plastic up to temperatures at which decomposition begins.

The polymerized vinyl halide may be any of the solid polymers of the vinyl halides, either the incompletely polymerized alpha or beta polymers or the completely polymerized gamma polymer, and may be treated with the sulphide in the presence or absence of plasticizers. However, the invention has found its greatest use in connection with compositions prepared from the completely polymerized or gamma polymer of vinyl chloride together with considerable proportions of plasticizer.

The sulphide used may be any of the alkali metal sulphides, particularly the monosulphides of sodium or potassium, or their polysulphides, such as the pentasulphide. The polysulphides of the alkaline earth metals, including those of magnesium, calcium, strontium and barium are also suitable. Ammonium sulphide decomposes too rapidly to be particularly useful. It is preferred to employ salts with water of crystallization, or if anhydrous salts are used to add a certain quantity of water to facilitate incorporation of the sulphides, for the completely anhydrous salts are hard solids which do not melt at temperatures at which the mixing is ordinarily accomplished and are therefore extremely difficult to disperse uniformly. The sulphides are mixed into the polymerized vinyl chloride composition in the same manner and at the same time that the plasticizers are added, either on a heated roll mill or in a heated internal mixer. During the mixing the sulphide becomes uniformly dispersed and the water (if any) evaporates.

If it is desired to use a polysulphide, it may be prepared in advance—for example, by warming hydrated sodium sulphide with the desired proportion of sulphur, whereupon the sulphur reacts with the sulphide to form the polysulphide which dissolves in the water of crystallization—and the polysulphide then mixed into the vinyl chloride composition, or the two ingredients sulphur and sodium sulphide (or its equivalents) may be directly added, either together or separately, to the batch. The order of mixing in the latter case seems to have little or no effect on the product. If sulphur and hydrated sodium sulphide, for example, are separately added, the sulphur appears to react in a proportion up to about one-fourth the weight of the hydrated sodium sulphide (this corresponds approximately to a trisulphide), any sulphur in excess of this proportion giving rise to a pronounced sulphur bloom on the product. Compositions prepared from polysulphides are ordinarily somewhat softer and more resilient than those prepared from the monosulphides.

The reaction between the polymerized vinyl chloride and the sulphide takes place to some extent at mixing temperatures, which are ordinarily above 200° F., especially if the proportion of sulphide is high. The extent of the reaction during mixing is ordinarily not sufficient to cause appreciable difficulties in handling. At temperatures in the neighborhood of 300° F., which is the ordinary molding temperature for polymerized vinyl chloride compositions, the reaction is rapid and gives a well cured product within 30 minutes.

The proportion of sulphide used depends on the proportion of plasticizer and on the nature of the product desired. Moderately large proportions of sulphide greatly stiffen the compositions. Smaller proportions do not greatly change the softness or flexibility of the composition, but even relatively small proportions greatly improve the strength of the compositions at elevated temperatures, and ordinarily overcome entirely their tendency to flow at temperatures below those at which decomposition begins. When sodium sulphide is used, the proportion is preferably between about 1% and 10% (on anhydrous basis) of the weight of polymerized vinyl chloride, although either smaller or larger proportions may be used if desired. After some 5% has been incorporated, the addition of further quantities produces a relatively small change in the properties of the product. If other sulphides are used, the proportions will be correspondingly modified.

As a specific example of one embodiment of the invention, the completely polymerized or gamma polymer of vinyl chloride is mixed on a steam heated roll mill with one and a half times its weight of tri-cresyl phosphate and one eighth its weight of hydrated sodium sulphide ($Na_2S.9H_2O$) and one fortieth its weight of sulphur. The composition is heated in a press mold for 30 minutes at 307° F. (the temperature of steam at a pressure of 60 pounds per square inch). The product is non-plastic even at this temperature and may therefore be removed from the mold while still hot. It is soft and rubbery in consistency, although its extensibility is lower than that of rubber. A composition of approximately the same degree of softness and resiliency, but not cured in accordance with this invention would consist of about 55% polymerized vinyl chloride and 45% plasticizer (as compared with about 38% polymerized vinyl chloride in the composition described above) and would be semi-fluid at molding temperature so that it could not be extracted until the mold is cooled. The product of this invention, in addition to possessing improved physical properties, requires considerably less of the polymerized vinyl chloride and can be made with a much reduced expenditure of time and fuel in molding because it does not require cooling in the mold.

A composition containing polymerized vinyl chloride mixed with 75% of its weight of plasticizer and 6% of its weight of hydrated sodium sulphide, after curing in the manner described above, has the consistency of a very stiff soft rubber, and remains rubbery and non-plastic even at temperatures above 300° F. A composition of corresponding stiffness but not cured in accordance with this invention requires the use of higher proportions of polymerized vinyl chloride and is semi-fluid at molding temperatures.

A composition containing polymerized vinyl chloride mixed with 75% of its weight of plasticizer and 12% of its weight of hydrated sodium sulphide, after curing in the manner described above, is stiff and boardy but still flexible, its consistency somewhat resembling that of gutta percha. A composition prepared from the same ingredients with the addition of 2 or 3% of sulphur is somewhat softer than that just described.

A composition comparable in stiffness to these two compositions, but not cured in accordance with this invention requires the use of higher proportions of polymerized vinyl chloride and is not only plastic at molding temperatures, but is more difficult to prepare because the quantity of plasticizer is insufficient to make it work readily at convenient mixing temperatures.

It is evident that many modifications can be made without exceeding the spirit and scope of the invention, hence it is not intended to limit it except as may be required by the prior art and as indicated in the appended claims.

I claim:

1. The method which comprises heating a mixture of a polymerized vinyl halide and a water soluble sulphide.

2. The method which comprises heating a mixture of polymerized vinyl chloride and a water soluble sulphide.

3. The method which comprises heating a mixture of polymerized vinyl chloride with a small proportion of an alkali metal sulphide.

4. The method which comprises heating a mixture of polymerized vinyl chloride, a plasticizer and an alkali metal sulphide.

5. The method which comprises mixing polymerized vinyl chloride, a plasticizer and a small proportion of a water soluble sulphide in the presence of water, and heating.

6. The method which comprises heating polymerized vinyl chloride with sodium monosulphide.

7. The method which comprises heating polymerized vinyl chloride with sodium polysulphide.

8. The method which comprises mixing completely polymerized vinyl chloride, a plasticizer and a small proportion of a sodium sulphide, and heating.

9. The method which comprises mixing completely polymerized vinyl chloride, a plasticizer and a small proportion of hydrated sodium monosulphide, and heating.

10. The method which comprises mixing completely polymerized vinyl chloride, a plasticizer and a small proportion of hydrated sodium polysulphide, and heating.

11. A composition resulting from the heat reaction of a polymerized vinyl halide with a water soluble sulphide.

12. A composition resulting from the heat reaction of polymerized vinyl chloride with a water soluble sulphide.

13. A composition resulting from the heat reaction of polymerized vinyl chloride with an alkali metal sulphide.

14. A composition resulting from the heat reaction of polymerized vinyl chloride containing a plasticizer with a water soluble sulphide.

15. A composition resulting from the heat reaction of completely polymerized vinyl chloride containing a plasticizer with a small proportion of sodium monosulphide.

16. A composition resulting from the heat reaction of completely polymerized vinyl chloride containing a plasticizer with a small proportion of sodium polysulphide.

RANDOLPH W. McGAHEY.